United States Patent
Mukai et al.

[11] Patent Number: 6,103,167
[45] Date of Patent: Aug. 15, 2000

[54] PROCESS FOR PRODUCING A SANDWICH MOLDED ARTICLE

[75] Inventors: Hiroshi Mukai; Yasunobu Teramoto; Yoshihiro Inada; Hirohisa Narukawa, all of Inazawa, Japan

[73] Assignee: Toyoda Gosei Co., Ltd., Aichi, Japan

[21] Appl. No.: 08/907,893

[22] Filed: Aug. 11, 1997

Related U.S. Application Data

[62] Division of application No. 08/453,991, May 30, 1995, abandoned, which is a continuation of application No. 07/826,612, Jan. 28, 1992, abandoned.

[30] Foreign Application Priority Data

Jan. 31, 1991 [JP] Japan .................................... 3-011278

[51] Int. Cl.[7] ............................ B29C 35/00; B29C 45/16
[52] U.S. Cl. ...................... 264/255; 264/327; 264/328.8; 264/328.14; 264/328.16
[58] Field of Search ................................ 264/255, 328.8, 264/328.16, 328.14, 327

[56] References Cited

U.S. PATENT DOCUMENTS

| | | |
|---|---|---|
| 4,002,362 | 1/1977 | Sears et al. . |
| 4,206,165 | 6/1980 | Dukess . |
| 4,342,810 | 8/1982 | Adcock . |
| 4,539,171 | 9/1985 | Sorensen . |
| 4,550,043 | 10/1985 | Beck .......................................... 428/36 |
| 4,609,516 | 9/1986 | Krishnakumar et al. ................ 264/255 |
| 4,621,114 | 11/1986 | Watanabe . |
| 4,634,735 | 1/1987 | Thiersault et al. . |
| 4,687,804 | 8/1987 | Shiraishi et al. . |
| 4,713,419 | 12/1987 | Takimoto et al. . |
| 4,808,450 | 2/1989 | Guy . |
| 4,957,682 | 9/1990 | Kobayashi et al. ...................... 264/255 |
| 4,966,544 | 10/1990 | Mitake ..................................... 425/552 |
| 4,974,809 | 12/1990 | Lipke et al. ............................... 249/82 |
| 5,122,398 | 6/1992 | Seiler et al. . |
| 5,180,629 | 1/1993 | Terada et al. . |
| 5,221,507 | 6/1993 | Beck et al. ............................... 264/255 |

FOREIGN PATENT DOCUMENTS

| | | |
|---|---|---|
| 52-11336 | 3/1977 | Japan . |
| 54-1809 | 1/1979 | Japan . |
| 1-233178 | 9/1989 | Japan . |
| 2-200543 | 8/1990 | Japan . |

*Primary Examiner*—Jan H. Silbaugh
*Assistant Examiner*—Suzanne E. McDowell
*Attorney, Agent, or Firm*—Pillsbury Madison & Sutro LLP

[57] ABSTRACT

A sandwich molded article comprising a thick skin or outer layer, a thin skin or outer layer, and a core layer surrounded by these skins or outer layers. A process for producing said sandwich molded article by the use of a mold(s) which comprises adjusting the temperature of an inner surface of the mold corresponding to a skin portion of the molding desired to be made thick, to a temperature lower than that of an inner surface of the mold corresponding to a skin portion of the molding desired to be made thin; injecting a skin material in a softened state into the mold; and then injecting a core layer material in a softened state into the skin material. According to the present invention, there can be obtained a sandwich molded article having a core layer from which the distances to the obverse and the reverse of the molded article are different. This molded article can be given a satisfactory decorative surface and has deformation-preventing ability.

15 Claims, 9 Drawing Sheets

PROCESS FOR PRODUCING A SANDWICH MOLDED ARTICLE

This is a division of Application Ser. No. 08/453,991, filed May 30, 1995 now abandoned; which is a continuation of Application Ser. No. 07/826,612, filed Jan. 28, 1992 now abandoned.

BACKGROUND OF THE INVENTION

1. Field of the Invention

The present invention relates to a process for producing a sandwich molded article whose skin (outer layer) is not uniform in thickness in parts.

In particular, the present invention relates to a mud guard for automobile and a molding attached to each side of an automobile, its bumper, etc., and a process for producing them.

2. Description of the Related Art

As a process for sandwich molding of a synthetic resin, there is, for example, the technique disclosed in Japanese Patent Application Kokoku No. 52-11336. The technique disclosed in the above reference comprises injecting a non-multicellular material for skin into the cavity of a mold through an injection nozzle at first, further injecting thereto a material for inner core which is made multicellular by a blowing agent, and thereby producing a synthetic resin sandwich molded article composed of the non-multicellular skin material and the inner-core material which has been made multicellular. When this technique is utilized, there can be produced a sandwich molded article composed of a hard core layer in the inner part and a soft skin coated thereon.

In a certain molded article, there is a portion which is desired to be composed of a sandwich molded article wherein a part of its skin is thick and the other part thereof is thin. That is, flexibility is imparted to a part of the sandwich molded article by thickening the skin, and stiffness is imparted to the other part by thickening the core layer by thinning the skin.

Figure 8:
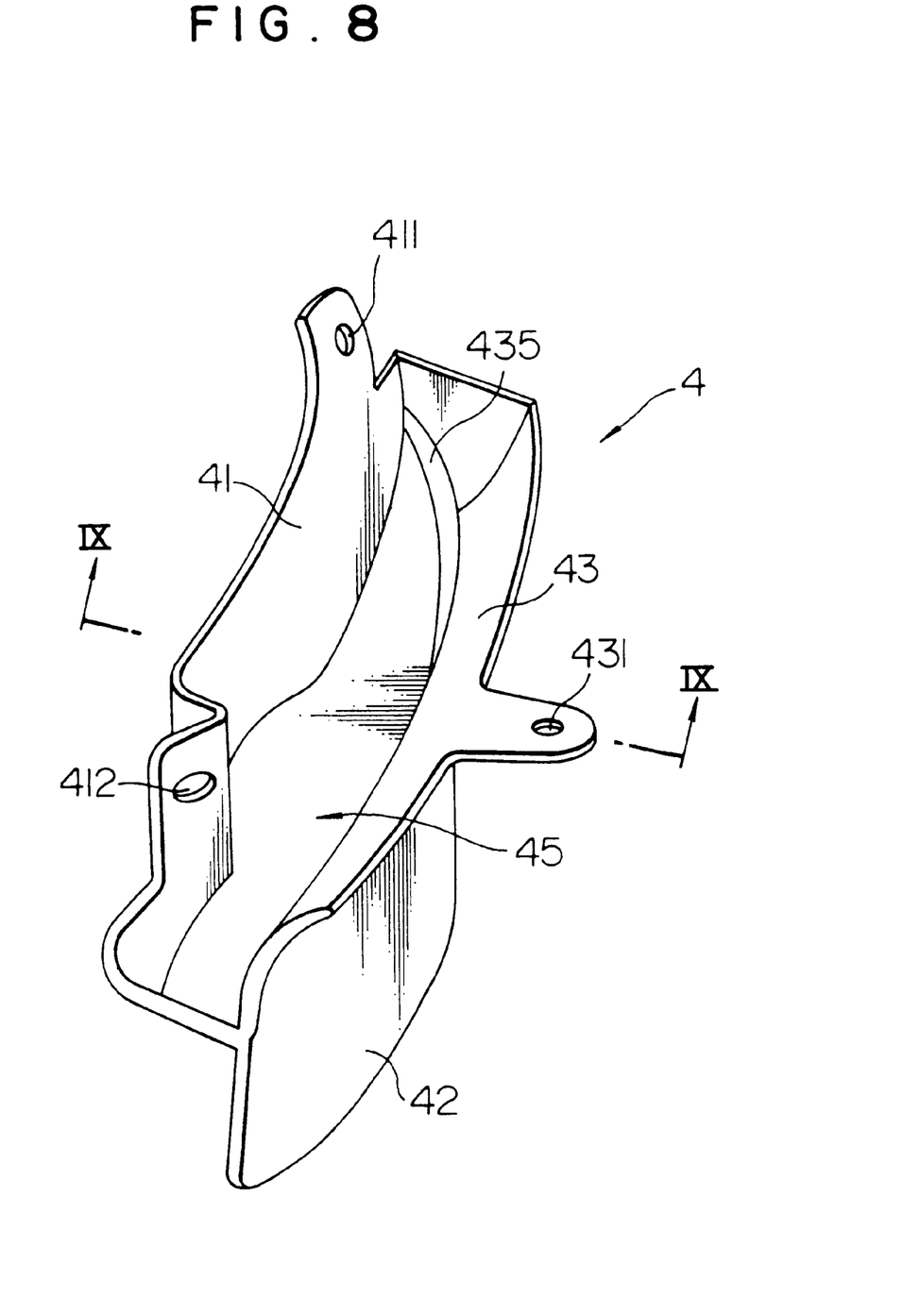
FIG. 8 is a perspective view of the mud guard.
Figure 9:
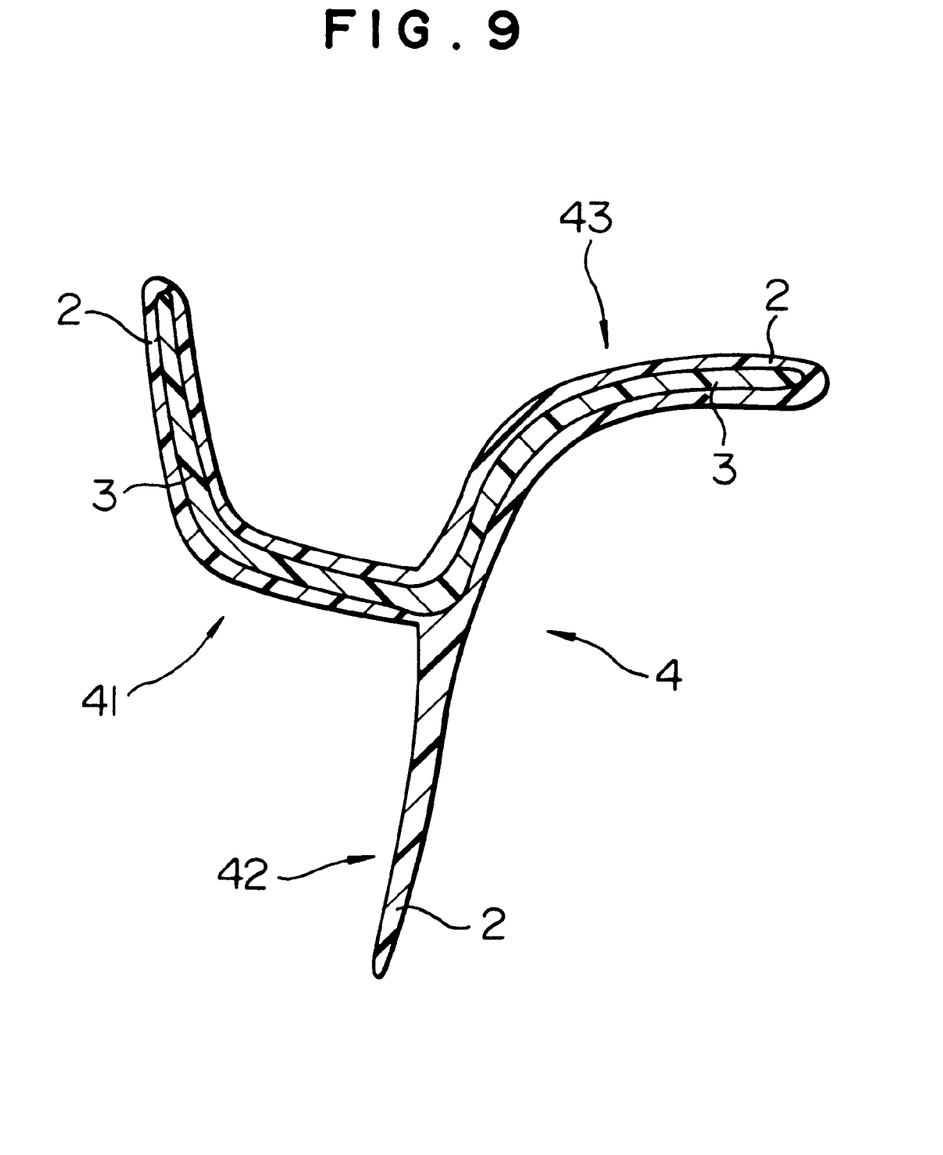
FIG. 9 is a sectional view taken along the line 9—9 of FIG. 8.

For example, as shown in FIG. 8 and FIG. 9, the mud guard 4 for automobile disclosed in Japanese Patent Application Kokai No. 1-233178 comprises a main body 41 and a mounting part 43 which are to be attached to a car body, and a lower piece 42 suspended under them.

The main body 41 has mounting holes 411 and 412 for inserting bolts. The mounting part 43 has the same mounting hole 431 as them. Between the main body 41 and the mounting part 43, a hollow 45 surrounded by them is provided. The hollow 45 is a portion into which a part of a car body is to be inserted. As shown in FIG. 9, the section structure of the mud guard 4 is such that a core layer material 3 is enveloped in parts in a skin material 2 by reducing the thickness of the lower piece 42. A flexible synthetic resin is used as the skin material 2. On the other hand, a rigid synthetic resin is used as the core layer material 3. In short, the mud guard consisting of said sandwich molded article has flexibility and stiffness imparted by enveloping the rigid core layer material 3 in the flexible skin material 2 in parts.

In the above-mentioned mud guard, the main body 41 and the mounting part 43 are required to have a high stiffness because they are attached to a car body by using the mounting holes 411, 412 and 431. On the other hand, the lower piece 42 is required to have flexibility which is such that the lower piece 42 undergoes elastic deformation easily when brought into contact with, for example, a block for division in a parking zone. However, in conventional processes for producing a sandwich molded article, the design of the molded article is limited because the molded article is obtained by varying its thickness, as described above. These processes are disadvantageous also in that owing to the influence of the core layer, no satisfactory decorative surface can be obtained in a portion in which the skin is thin.

On the other hand, as a side molding attached to each side of an automobile, there has been known a side molding comprising a main body of molding made of rubber or synthetic resin and a metal strip extending in the longitudinal direction of the main body which is embedded in the main body [Japanese Utility Model Registration Kokai No. 54-1809]. The metal strip embedded in the main body of molding has an adhesive previously applied thereon for adhering the metal strip to the main body of molding. The metal strip suppresses warping of the side molding and prevents peeling of the side molding from the body of an automobile.

As another side molding, there is known a side molding comprising a main body of molding (a basal part) made of a flexible resin such as a polypropylene blend with an ethylene-propylene-diene terpolymer rubber (hereinafter referred to as EPDM), and a core therein made of a rigid resin such as a polypropylene containing talc, said rigid resin having a coefficient of linear expansion smaller than that of said flexible resin [Japanese Patent Application Kokai No. 2-200543]. By virtue of such a constitution, the side molding has stiffness and softness of the surface and is prevented from changing in size.

However, in the case of the former side molding, common rubber or resin used as a material for the surface portion of the main body of molding does not have sufficient adhesive properties, and hence a primer is needed when a coating layer is formed on the surface of the side molding. Moreover, the former side molding has been disadvantageous in that an adhesive should be previously applied on the metal strip in order to improve the adhesion of the metal strip to the main body of molding.

The latter side molding has been disadvantageous in that the polypropylene blend with EPDM which constitutes the main body of molding does not have sufficient adhesive properties, and that the adhesion between the main body of molding and the core is low.

SUMMARY OF THE INVENTION

In view of such conventional problems, an object of the present invention is to provide a process for producing a sandwich molded article in which optional portions of its skin are different from the other portions in thickness and which can be given a satisfactory decorative surface.

In detail, the present invention relates to a sandwich molded article comprising a thick skin, a thin skin and a core layer surrounded by these skins; and a process for producing said sandwich molded article by the use of a mold(s), which comprises adjusting the temperature of an inner surface of the mold corresponding to a skin portion of the molding desired to be made thick, to a temperature lower than that of an inner surface of the mold corresponding to a skin portion of the molding desired to be made thin, injecting a skin material in a softened state into the mold, and then injecting a core layer material in a softened state into the skin material.

An another object of the present invention is to provide a molding which is excellent in the adhesion between a core layer and an outer layer, can have a coating layer with an excellent adhesion optionally formed on the surface of the outer layer without a primer, and has deformation-preventing ability, and a process for producing the molding.

Still another object of the present invention is to provide a molding which is effectively prevented from being shrinked or warped in the longitudinal direction of the molding.

Thus, the present invention further relates to a side molding for automobile which comprises a thick outer layer, a thin outer layer and a core layer surrounded by these outer layers, said core layer therefore being provided nearer to the obverse of the molding than to the reverse of the molding; and a process for producing said side molding which comprises heating a mold(s) in such a way that the temperature of an inner surface of the mold corresponding to the obverse of the molding is higher than that of an inner surface of the mold corresponding to the reverse of the molding, injecting a thermoplastic polymer for forming the outer layer into a molding cavity having a shape corresponding to a long molding through a gate, and allowing a thermoplastic polymer for forming the core layer of the molding to flow in the longitudinal direction of the molding cavity, after or while conducting the above injection, to mold the core layer and the outer layer.

BRIEF DESCRIPTION OF THE DRAWINGS

FIGS. 1 to 6 shows a first embodiment of the present invention.

FIGS. 8 and 9 show a conventional mud guard.

DESCRIPTION OF THE PREFERRED EMBODIMENTS

The present invention is directed to a process for producing a sandwich molded article comprising a thick skin, a thin skin, and a core layer surrounded by these skins, by the use of a mold(s), which comprises adjusting the temperature of an inner surface of the mold corresponding to a skin portion of the molding desired to be made thick, to a temperature lower than that of an inner surface of the mold corresponding to a skin portion of the molding desired to be made thin; injecting a skin material in a softened state into the mold; and then injecting a core layer material in a softened state into the skin layer material.

What is most noticeable in the present invention is that the temperature of an inner surface of the mold corresponding to a skin portion of the molding desired to be made thick is lower than that of an inner surface of the mold corresponding to a skin portion of the molding desired to be made thin.

As a means for making such a temperature difference, there is a method in which a cooling channel is provided near each inner surface of the mold and the temperature of cooling water to be passed through the cooling channel is varied depending on the position of the inner surface. In detail, the temperature of cooling water is low for an inner surface of the mold corresponding to a portion where the thick skin is desired to be formed. On the other hand, the temperature of cooling water is high for an inner surface of the mold corresponding to a portion where the thin skin is desired to be formed.

A skin material is injected into the mold and then a core layer material is injected into the skin layer material. As a method other than the above method, there is a method in which a cooling channel is provided near an inner surface of the mold corresponding to a skin portion of the molding desired to be made thick, and another cooling channel is provided far from an inner surface of the mold corresponding to a skin portion of the molding desired to be made thin.

It is also possible to carry out the above injections by using a split mold composed of mold sections adjusted to different temperatures. It is also possible to use a core, adjust the core and a main body of mold to different temperatures, and produce a molded article in which the thickness of a skin formed on the core side is different from the thickness of a skin formed on the mold main body side.

In the production process of the present invention, the temperature of an inner surface of a mold corresponding to a skin portion of the molding desired to be made thick is low, while the temperature of an inner surface of the mold corresponding to a skin portion of the molding desired to be made thin is high.

Therefore, when injected into the mold, a heated skin material in a softened state is rapidly cooled and solidified to form a thick layer, on the inner surface of the mold which has a low temperature.

On the other hand, on the inner surface of the mold which has a high temperature, the skin material is gradually cooled and solidified, so that a core layer material pushed forward the skin material whose inner part has not yet been solidified, before the thickness of a solidified layer of the skin material becomes large. Therefore, the thickness of skin does not become large.

In the above molding, the injection of the skin material is stopped before a part of the cavity of the mold is not filled with the skin material, in consideration of the volume of the core layer material which is to be injected into the skin material.

The core layer material in a softened state is injected into the skin material. Then, the core layer moves forward in the skin material. The cavity of the mold is filled with the skin material and the core layer material enveloped therein.

What is important here is that when the core layer material moves forward, the skin material is present around the core layer material, and that as described above, the thickness of a cooled and solidified layer of the skin material depends on the temperature of inner surface of the mold.

When the core layer material moves forward in the skin layer material, a portion of the skin material which is on the low-temperature inner surface of the mold forms a thick solidified layer, so that an inner portion of the skin material which is in contact with the flowing core layer material is not carried so far by the core layer material.

On the other hand, a portion of the skin material which is on the high-temperture inner surface of the mold is not much cooled and forms a thin solidified layer. Therefore, in this case, an inner portion of the skin material which is in contact with the flowing core layer material is carried forward by the core layer material. Accordingly, the portion of the skin material which is on the high-temperature inner surface of the mold is formed into a thin layer.

Therefore, according to the present invention, there can be provided a process for producing a sandwich molded article in which optional portions of its skin are different from the other portions in thickness.

For producing the above-mentioned molding, the present invention is directed to a process for producing a molding comprising a core layer formed of a polypropylene containing a filler, an outer layer formed of a styrene-butadiene based copolymer on the periphery of the core layer, and a coating layer formed on the surface of the outer layer, which comprises injecting the styrene-butadiene based copolymer for forming the outer layer into a mold having a molding cavity having a shape corresponding to a long mole through a gate; and allowing at least the filler-containing polypropylene for forming the core layer of the molding to flow in the longitudinal direction of the molding cavity, after or while conducting the above injection, to mold the core layer and the outer layer.

Since the outer layer is formed of the styrene-butadiene based copolymer having satisfactory adhesive properties, the outer layer exhibits an excellent adhesion to the filler-containing polypropylene constituting the core layer placed in contact with the inner surface of the outer layer. Furthermore, it becomes possible to form a coating layer with an excellent adhesion on the outer surface of the outer layer without a primer. In addition, first, the styrene-butadiene based copolymer for forming the outer layer is injected into the molding cavity through the gate. After completing or while continuing the injection, the filler-containing polypropylene for forming the core layer of the molding is injected into the molding cavity, and at least the filler-containing polypropylene is allowed to flow in the longitudinal direction of the molding cavity, whereby the core layer and the outer layer are molded. Thus, molecules of the filler incorporated into the polypropylene for forming the core layer are aligned in the longitudinal direction of the molding, so that in particular, the shrinkage of the molding in the longitudinal direction of the molding is prevented.

By forming a thick core layer, the molding can be more effectively prevented from being warped, as compared with the above-mentioned molding of Japanese Utility Model Registration Kokai No. 54-1809.

EXAMPLE 1

An embodiment of the present invention into a process for producing a sandwich molded article is explained below with reference to FIGS. 1 to 6.

Figure 5:
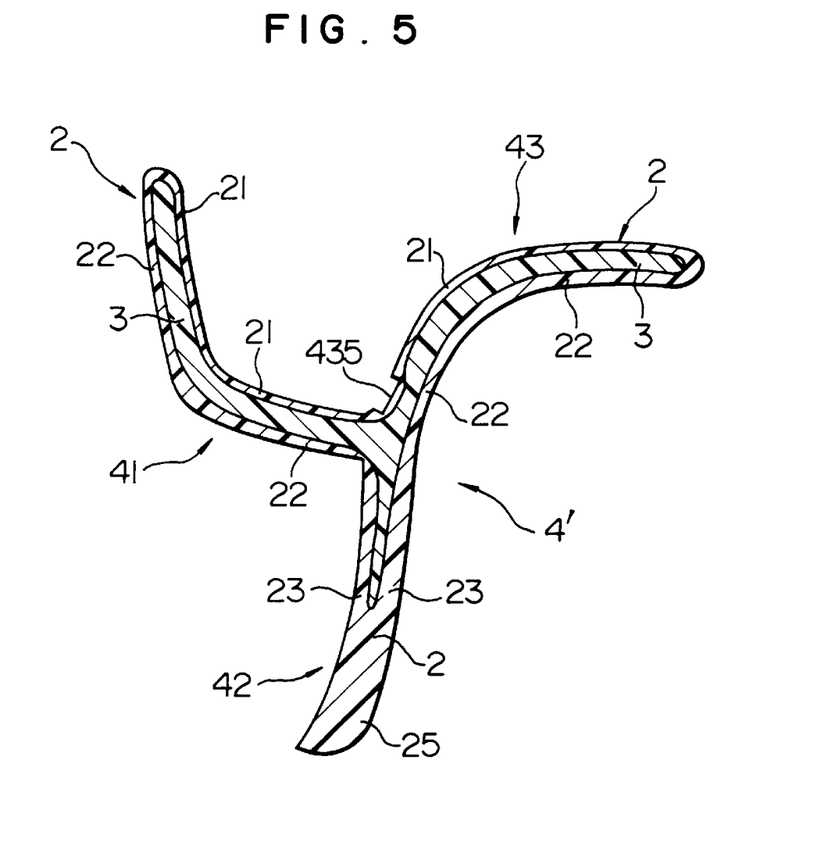
FIG. 5 is a sectional view taken along the line 5—5 of FIG. 6.
Figure 6:
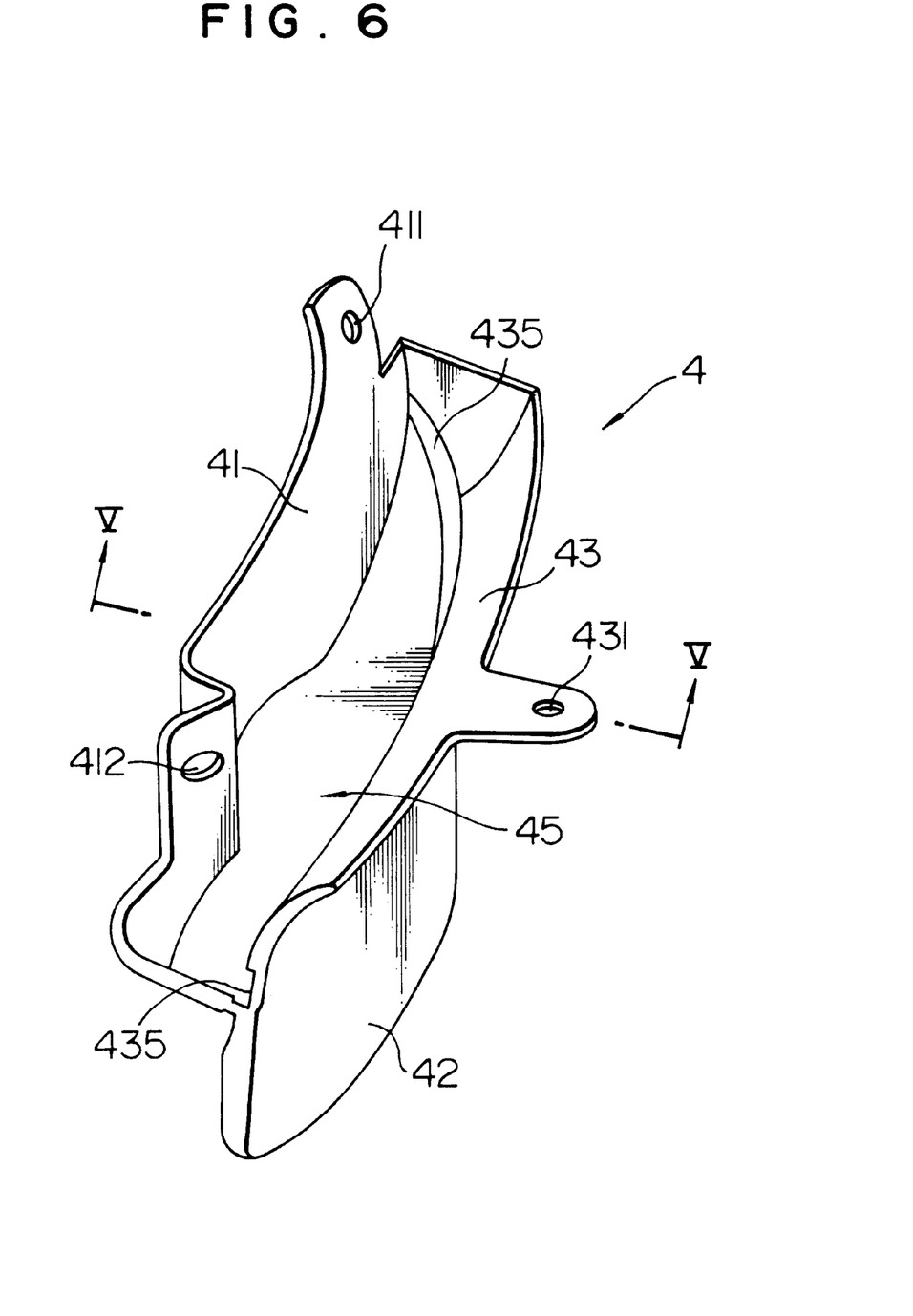
FIG. 6 is a perspective view of a mud guard.

In the present example, a sandwich molded article is produced as a mud guard for automobiles. As shown in FIG. 5 and FIG. 6, the mud guard 4 is composed of a main body 41, a mounting part 43 and a lower piece 42. The mud guard 4 has a sandwich structure consisting of a core layer material 3 and a skin material 2 covering the outer surface of the core layer material 3. What is important here is as follows. As shown in FIGS. 5 and 6, in the main body 41 and the mounting part 43, a skin 21 on the side of the obverse (upper part) is thin, while a skin 22 on the side of the reverse (lower part) is thick. In the lower piece 42, a skin 23 on both right and left sides is particularly thick. The lower part of the mounting part 43 has a reentrant groove 435 near the boundary between the mounting part 43 and the lower piece 42. The reentrant groove 435 is formed by the flow resistance part 105 of a mold.

A method for molding the mud guard 4 is explained below.

Figure 1:
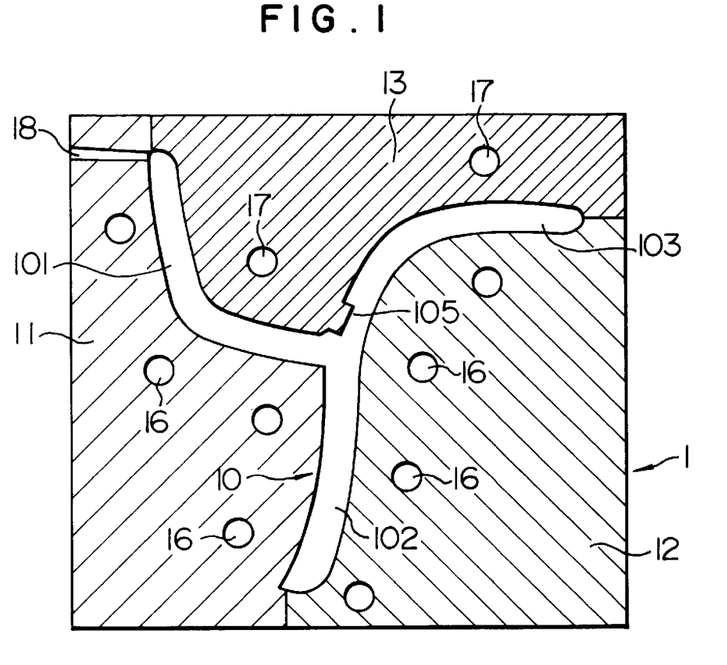
FIG. 1 is a cross-sectional view of a mold.

A mold 1 used in this molding method is composed of mold sections 11 to 13, as shown in FIG. 1. A space surrounded by these mold sections constitutes a cavity 10 for molding the mud guard.

The cavity 10 is composed of a main-body-forming section 101, a lower-piece-forming section 102 and a mounting-part-forming section 103. Each of the mold sections 11 and 12 is provided with a plurality of cooling channels 16 near its inner surface. The mold section 13 is also provided with a cooling channel 17 near its inner surface. The mold section 13 is provided with a flow resistance part 105 projecting near the inlet of the mounting-part-forming section 103.

The mold section 11 is provided with a gate 18 having an opening to the main-body-forming section 101. The gate 18 is connected to an injection molding machine for injecting a skin material and an injection molding machine for injecting a core layer material (not shown).

Figure 2:
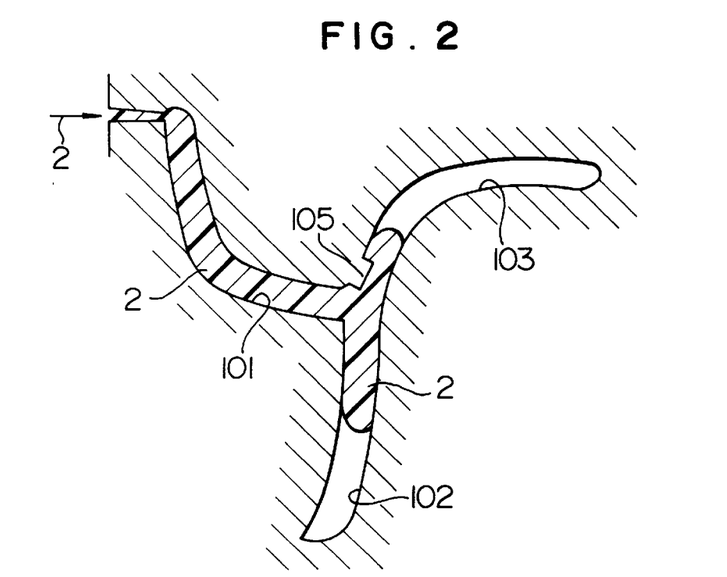
FIGS. 2 to 4 are illustrations of resin flows in sandwich molding.

An injection molding method is explained below with reference to FIGS. 2 to 4.

First, as shown in FIG. 1, cooling water at a low temperature (for example, 10° C.) is passed through the cooling channels 16 for the mold sections 11 and 12. Cooling water at a high temperature (for example, 20° C.) is passed through the cooling channel 17 for the mold section 13.

While thus passing the cooling waters, a skin material 2 is injected into the main-body-forming section 101 through the gate 18. The volume of the skin material 2 injected is a remainder obtained by subtracting the volume of a core layer material from the capacity of the cavity.

During the injection, the skin material 2 is pushed forward in the main-body-forming section 101. In this case, a portion of the skin material 2 which is in contact with the wall of the cavity is solidified to form a skin. When the end of the skin material 2 reaches the boundary between the mounting-part-forming section 103 and the lower piece 102, a larger amount of the skin material 2 flows into the lower-piece-forming section 102 wherein only a low flow resistance exists, than into the mounting-part-forming section 103 because the flow resistance part 105 exists in the section 103. Thus, a smaller amount of the skin material flows into the mounting-part-forming section 103.

Figure 3:
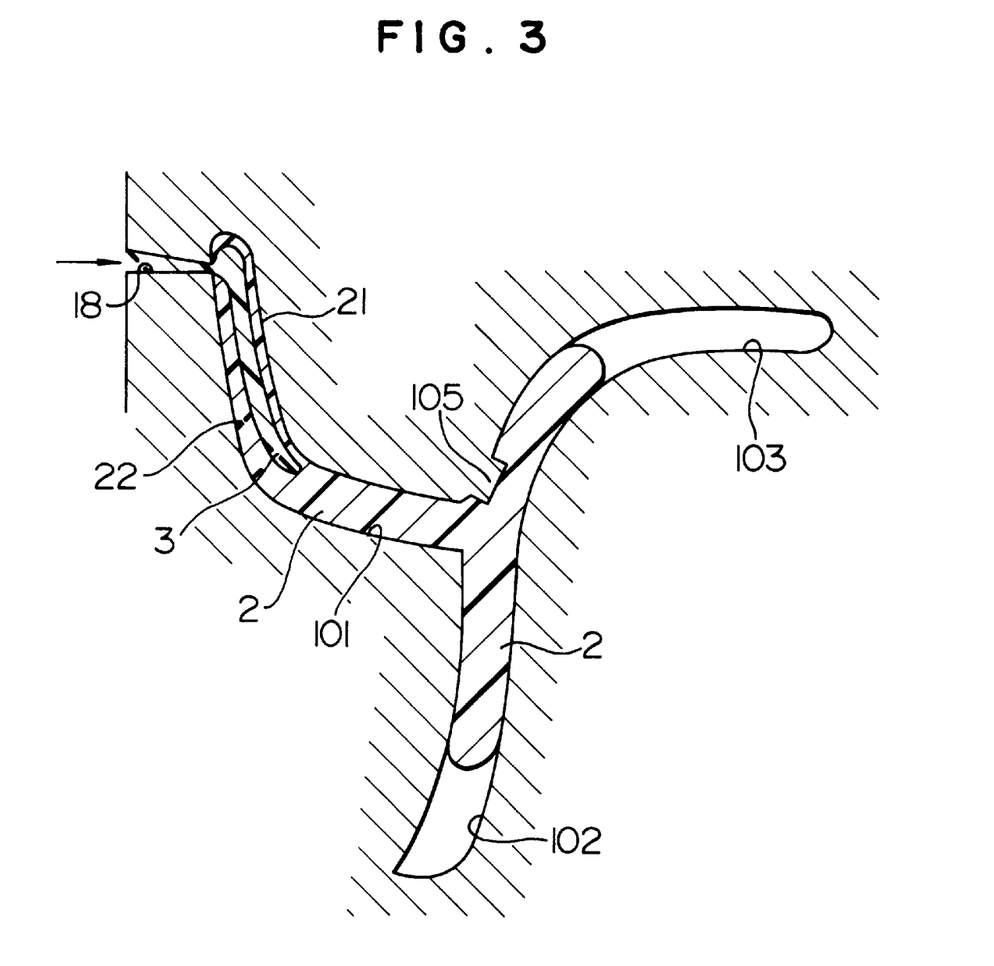
Figure 4:
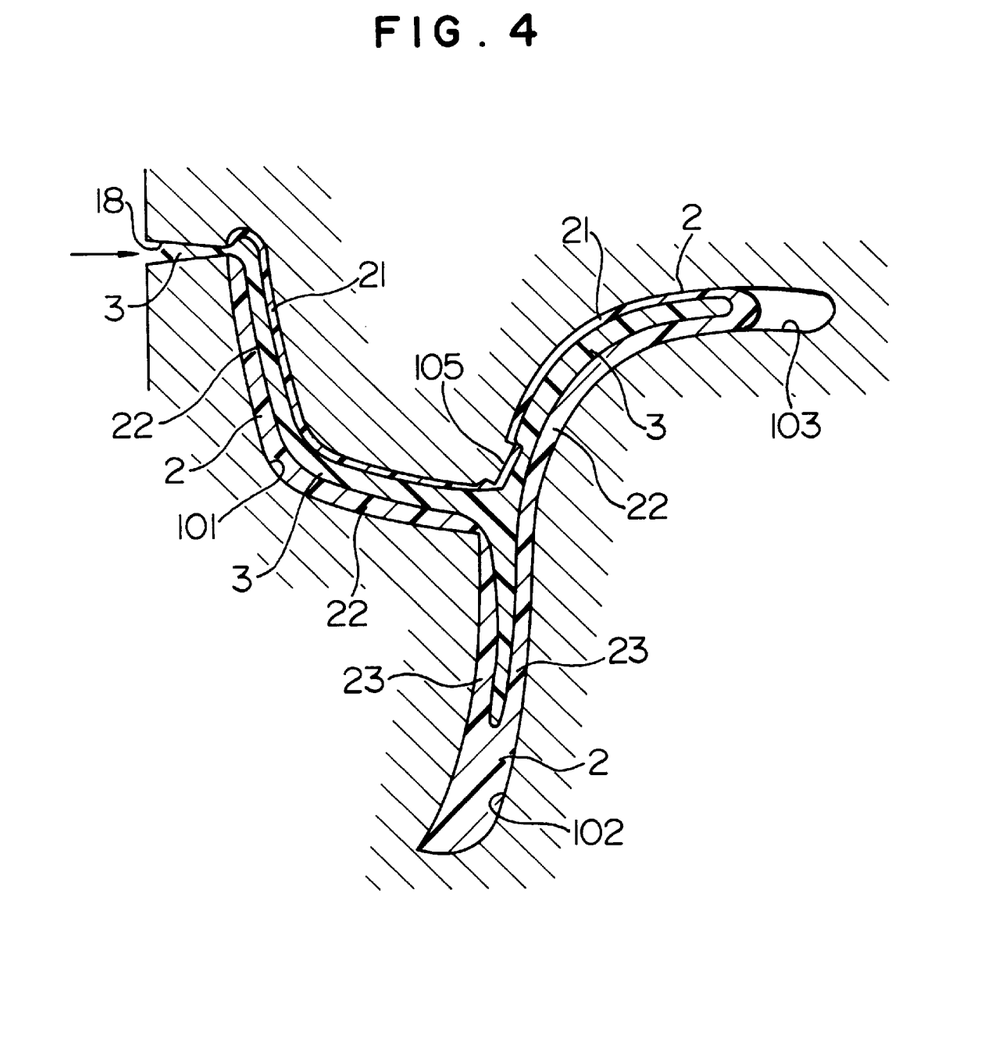

After the injection of the skin material 2, as shown in FIG. 3, the core layer material 3 is injected into the skin material 2 in the main-body-forming section 101 through the gate 18. Owing to this injection, the core layer material 3 moves forward in the skin material 2 and the central portion of the skin material 2 is further pushed forward.

Thus, the cavity is filled with the skin material 2 and the core layer material 3 therein.

Then, the whole materials are cooled and solidified and the resulting molded product is taken out of the mold 1. The molded product is the mud guard 4 shown in FIG. 5 and FIG. 6.

What is important in the above production process is that cooling that cooling water at a low temperature is passed through the cooling channels 16 for the mold sections 11 and 12, while cooling water at high temperature is passed through the cooling channel 17 for the mold section 13.

Owing to the passage of the cooling waters, the skin material 2 which has entered the main-body-forming section 101 and the mounting-part-forming section 103 is rapidly cooled and solidified on the inner surfaces of the mold sections 11 and 12 because the temperature of the inner surfaces is low. Therefore, the skin material 2 forms a thick layer. On the other hand, the skin material 2 is gradually cooled and solidified on the inner surface of the mold section 13 because the temperature of the inner surface is high. Therefore, the skin material 2 forms a thin layer.

In the lower-piece-forming section 102, since the temperature of the mold sections 11 and 12 is low, the skin material 2 is intensely cooled from both sides. Therefore, the skin material 2 forms a thick layer, and a layer formed therein of the core layer material 3 is thin. The skin material 2 gets faster into the lower-piece-forming section 102 than into the mounting-part-forming section 103 because of the presence of the aforesaid flow resistance part 105, so that the end 25 of the lower-piece-forming section 102 is filled only with the skin material 2.

By the procedure described above, there can be obtained a sandwich molded article as mud guard in which as shown in FIG. 5, the skin 21 on the side of the obverse (upper part) of each of the main body 41 and the mounting part 43 is thin, the skin 22 on the side of the reverse (lower part) of each of them is thick, and the skin 23 of both right and left sides of the lower piece 42 is thick.

Since the mud guard 4 has the above structure, the skin 22 on the side of the reverse (lower part) of each of the main body 41 and the mounting part 43 which is to be made into decorative surface is in the form of a thick layer. Therefore, the skin 22 is not affected by the core layer material 3, so that a satisfactory decorative surface can be obtained. Since the skin 21 on the side of the obverse (upper part) of each of the main body 41 and the mounting part 43 is in the form of a thin layer, the thickness of the core layer material 3 in the skin 21 can be made uniform, so that the whole main body 41 and mounting part 43 can have a proper stiffness. The lower piece 42 contains a small amount of the core layer material 3 and hence is particularly flexible.

EXAMPLE 2

Figure 7:
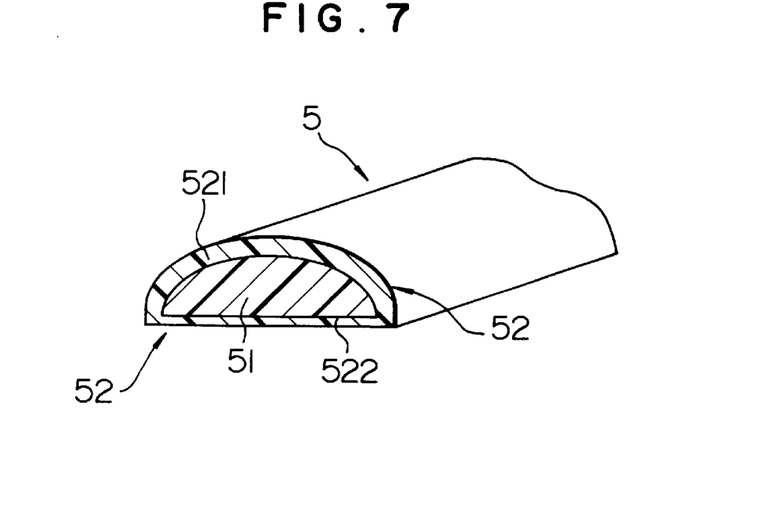
FIG. 7 is a sectional perspective view of a molding of a second embodiment.

In the present example, as shown in FIG. 7, the process of the present invention is employed for producing a molding 5 for automobile.

The molding 5 is a sandwich molded article obtained by covering the surface of a rigid core layer 51 with a flexible skin 52. The skin 52 has a large thickness on the decorative surface side 521 (the obverse) and a small thickness on the mounting side 522 (the reverse).

Such a molding 5 can be obtained by varying the temperature of the inner surface of a mold as in Example 1.

In other respects, the same procedure as in Example 1 applies in the present example.

Also in the present example, the same effects as in Example 1 can be obtained.

EXAMPLE 3

An embodiment of the present invention into a side molding is explained below with reference to FIGS. 10 to 14.

Figure 10:
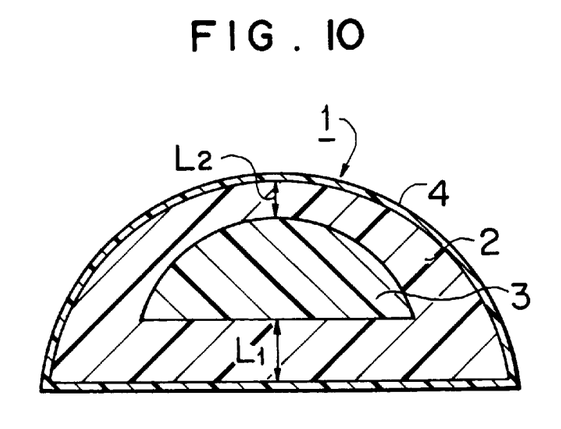
FIG. 10 is a cross-sectional view (along the line 10—10 of FIG. 11) of a side molding showing one embodiment of the present invention.
Figure 11:
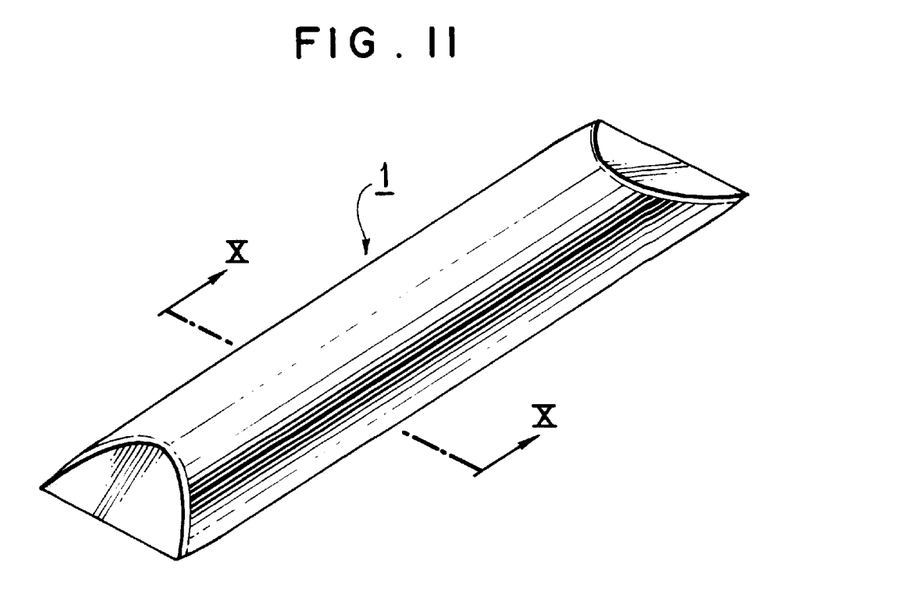
FIG. 11 is a perspective view of the side molding.

FIG. 10 is a cross-sectional view (along the line 10—10 of FIG. 11) of a side molding 1, and FIG. 11 is a perspective view of the side molding. As shown in the two figures, the side molding 1 of this embodiment is long and is composed of a core layer 3 formed in semi-cylindrical form, an outer layer 2 formed as a coat on the periphery of the core layer 3, and a coating layer 4 formed on the periphery of the outer layer 2. The core layer 3 is provided nearer to the obverse (namely, the upper side in FIG. 1) of the molding than to the reverse in the outer layer 2. That is, the thickness $L_1$ of the outer layer 2 between the reverse of the molding and the core layer 3 is larger than the thickness $L_2$ of the outer layer 2 between the obverse of the molding and the core layer 3.

The outer layer 2 is formed of a styrene-ethylene-butadiene-styrene copolymer (hereinafter referred to as SEBS). This SEBS gives excellent adhesive properties to the surface of the outer layer 2 owing to its composition including butadiene. As a material for forming the outer layer 2, styrene-butadiene based copolymers such as styrene-butadiene-styrene copolymers (hereinafter referred to as SBS) and the like can be used besides SEBS. The core layer 3 is formed of a polypropylene containing glass fiber as a filler. This polypropylene containing glass fiber has a smaller coefficient of linear expansion than does SEBS, and it has a function of suppressing the shrinkage of the side molding 1. As the filler, there may also be used carbon fiber, aramide fiber, mica, etc.

The coating layer 4 is formed by applying and drying a coating material. As the coating material, there can be used an urethane coating, acrylic coating, epoxy coating, etc. The coating layer 4 imparts weather resistance and a decorative design to the surface of the side molding 1.

Owing to the above constitution, the SEBS constituting the outer layer 2 of side molding 1 has good adhesive properties in its surface and hence exhibits excellent adhesion to the core layer 3 which is in contact with the inner surface of the outer layer 2. Moreover, the SEBS makes it possible to form the coating layer 4 with a good adhesion in contact with the outer surface of the outer layer 2 directly without using a primer as before.

Next, a process for producing the side molding 1 by a sandwich molding method is explained below.

Figure 12:
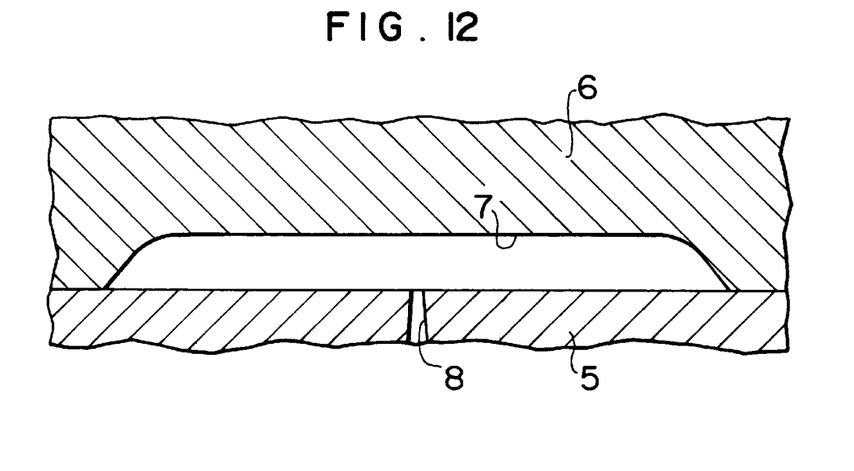
FIG. 12 is a cross-sectional view of a mold for a sandwich molding method.
Figure 13:
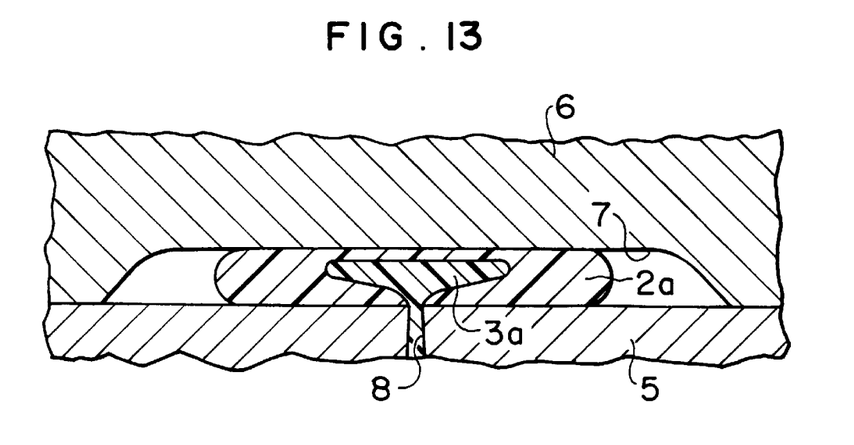
FIG. 13 is a cross-sectional view showing a resin for forming an outer layer and a resin for forming a core layer which have been injected into the cavity of the mold.

As shown in FIG. 12, a mold used in the sandwich molding method is composed of a fixed mold 5 on the lower side in FIG. 12 and a movable mold 6 on the upper side. A cavity 7 as a molding cavity having the same shape as that of the side molding 1 is formed in the molds 5 and 6. A gate 8 for injection of resin is provided in the fixed mold 5 substantially at the middle thereof in the lengthwise direction of the cavity 7. A tub (not shown) is provided at each end of the cavity 7 so as to make it possible to adjust the shape of the core layer 3 at the ends of the side molding 1 by taking out the surplus resin.

Then, the fixed mold 5 and the movable mold 6 are heated, for example, to 30° C. and 40° C., respectively. The temperatures of the molds 5 and 6 are determined usually in a range of 10° C. to 60° C. so as to adjust the difference between the temperatures to, for example, 10° C. As shown in FIG. 4, in such a condition of the molds, a definite amount of molten SEBS 2a is first injected through a gate 8 provided at the center of the cavity 7 to be fed to the cavity 7 in the lengthwise direction of the cavity 7. Subsequently, a molten glass-fiber-containing polypropylene 3a is injected to be fed to the cavity 7 in the lengthwise direction of the cavity 7. During this injection, the injection of SEBS 2a may be continued.

Owing to the above procedure, the SEBS 2a is pushed by the glass-fiber-containing polypropylene 3a to flow to both lengthwise ends of the cavity 7. In this case, since the temperature of the movable mold 6 is higher than that of the fixed mold 5 by 10° C., the fluidity of the SEBS 2a is higher on the movable mold 6 side than on the fixed mold 5 side. Therefore, the glass-fiber-containing polypropylene 3a flows on a course nearer to the inner surface of the movable mold 6 than to that of the fixed mold 5, (namely, on the upper side in FIG. 13). When the two resins reach each end of the cavity 7, the surplus resins flow into the tub (not shown) and the core layer 3 flows up to each end of the side molding 1. Thus, both ends of the side mole 1 are molded so as to have a two-layer structure as in other portions.

Figure 14:
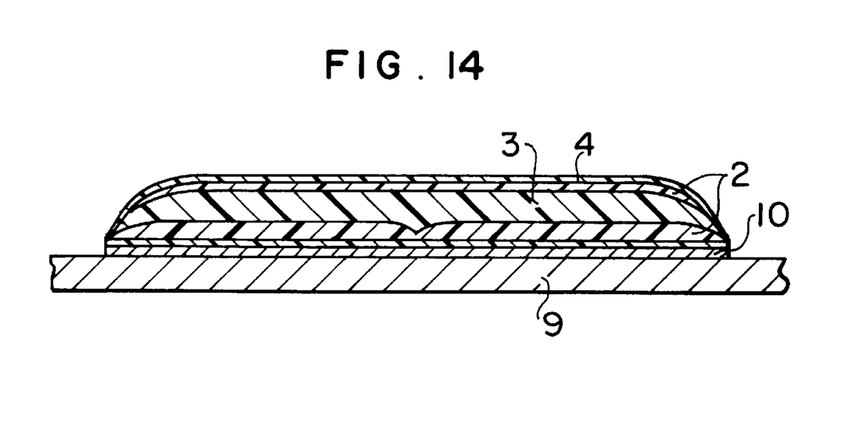
FIG. 14 is a cross-sectional view showing the side molding which has been attached to the side of the body of an automobile through an adhesive double coated tape.

The coating layer 4 is formed by applying a coating material directly on the periphery of the molded product thus obtained and then drying the same. Thus, the side molding 1 of a three-layer structure shown in FIG. 10 can be obtained. Then, as shown in FIG. 14, the side molding 1 is attached to an automobile by sticking the same to each side of the body 9 of the automobile through an adhesive double coated tape 10.

In the side molding 1 obtained in the manner described above, the SEBS constituting the outer layer 2 has excellent adhesive properties, as described above. Therefore, the outer layer 2 is good in adhesion to both the core layer 3 inside the outer layer 2 and the coating layer 4 outside the outer layer 2. Accordingly, it is not necessary to apply an adhesive or a primer previously as before.

In the side molding 1 of the present embodiment, as shown in FIG. 10, the core layer 3 is nearer to the obverse of the side molding 1 than to the reverse in the outer layer, namely, the relation $L_1 > L_2$ holds. Therefore, the shrinkage of the side molding 1 due to the SEBS is more remarkable on the side of the reverse than on the side of the obverse, so that warping of the side molding 1 at both crosswise ends is in the direction of the reverse. Therefore, the side molding 1 is unlikely to be peeled from the body 9 by the warping of the side molding 1 at both crosswise ends. In addition, since the polypropylene constituting the core layer 3 contains glass fiber, the side molding 1 is prevented from being warped at both lengthwise ends. Accordingly, there is no fear that the side molding 1 may be peeled from the body 9 as before by warping of the side molding 1 in the direction of the obverse at both lengthwise ends.

The present invention relating to a molding is not limited to the above embodiment and can be constituted, for example, as follows within the scope of the gist of the invention.

(1) Although a sandwich molding method is employed in the above embodiment as a method for molding the side molding 1, an extrusion molding method or the like may be employed in place of the sandwich molding method.

(2) The form of a section of the side molding 1 may also be any of a trapezoidal form, a tetragonal form and other irregular forms.

(3) Although the present invention was embodied into the side molding 1 in the above embodiment, it may be embodied into a bumper mole, etc.

(4) The coating layer 4 may be formed only on the side of the obverse (the decorative surface side) of the side molding 1.

What is claimed is:

1. A process for producing a sandwich molded article comprising a skin or outer layer of a first synthetic resin comprised of thick and thin portions and a core layer of a second synthetic resin, which process comprises the steps of:

adjusting a temperature of an inner surface of a mold in a section corresponding to the portion to be made thick, to a temperature lower than a higher temperature of an inner surface of the mold in a section corresponding to the portion to be made thin, wherein the mold is composed of at least two mold sections and constitutes a cavity inside, injecting the first synthetic resin in a molten state into the cavity of the mold in such an amount that does not completely fill the cavity and leaves a space wherein the first synthetic resin does not exist, injecting the second synthetic resin in a molten state into the first synthetic resin in a softened state in an amount sufficient so as to fill the cavity, cooling and solidifying a molded article, the outer layer being made thick in that portion formed by the inner surface of the mold at the lower temperature and the outer layer being made thin in that portion formed by the inner surface of the mold at the higher temperature, and taking the molded article out of the mold.

2. A process for producing a sandwich molded article according to claim 1, wherein the number of the mold sections is two.

3. A process for producing a sandwich molded article according to claim 2, wherein the second synthetic resin starts to be injected after the completion of the injection of the first synthetic resin.

4. A process for producing a sandwich molded article according to claim 2, wherein the second synthetic resin starts to be injected after the beginning of the injection of the first synthetic resin but before the completion of the injection of the first synthetic resin.

5. A process for producing a sandwich molded article according to claim 1, wherein the number of the mold sections is three.

6. A process for producing a sandwich molded article according to claim 5, wherein the temperature is adjusted in two sections.

7. A process for producing a sandwich molded article according to claim 6, wherein the second synthetic resin starts to be injected after the completion of the injection of the first synthetic resin.

8. A process for producing a sandwich molded article according to claim 6, wherein the second synthetic resin starts to be injected after the beginning of the injection of the first synthetic resin but before the completion of the injection of the first synthetic resin.

9. A process for producing a sandwich molded article according to claim 5, wherein the temperature is adjusted in at least three sections.

10. A process for producing a sandwich molded article according to claim 9, wherein the second synthetic resin starts to be injected after the completion of the injection of the first synthetic resin.

11. A process for producing a sandwich molded article according to claim 9, wherein the second synthetic resin starts to be injected after the beginning of the injection of the first synthetic resin but before the completion of the injection of the first synthetic resin.

12. A process for producing a sandwich molded article according to claim 5, wherein the second synthetic resin starts to be injected after the completion of the injection of the first synthetic resin.

13. A process for producing a sandwich molded article according to claim 5, wherein the second synthetic resin starts to be injected after the beginning of the injection of the first synthetic resin but before the completion of the injection of the first synthetic resin.

14. A process for producing a sandwich molded article according to claim 1, wherein the second synthetic resin starts to be injected after the completion of the injection of the first synthetic resin.

15. A process for producing a sandwich molded article according to claim 1, wherein the second synthetic resin starts to be injected after the beginning of the injection of the first synthetic resin, but before the completion of the injection of the first synthetic resin.

* * * * *